United States Patent [19]

Turner

[11] Patent Number: 4,535,353
[45] Date of Patent: Aug. 13, 1985

[54] VERTICAL REFERENCE SIGNAL IDENTIFICATION SYSTEM

[75] Inventor: Rudolf Turner, Vernon Hills, Ill.

[73] Assignee: Zenith Electronics Corporation, Glenview, Ill.

[21] Appl. No.: 662,219

[22] Filed: Oct. 18, 1984

[51] Int. Cl.³ ............................................... H04N 9/62
[52] U.S. Cl. .................................... 358/21 V; 358/139
[58] Field of Search ................ 358/21 V, 10, 139, 147

[56] References Cited

U.S. PATENT DOCUMENTS 3,989,891 11/1976 Freestone ............................. 358/139
4,170,026 10/1979 Nagaoke et al. ....................... 358/10
4,172,262 10/1979 Hosoya ............................... 358/21 V
4,198,651  4/1980 Barton et al. ....................... 358/21 V Primary Examiner—John W. Shepperd

[57] ABSTRACT

The horizontal sync component of a composite video signal having a rate H is provided to a phase locked loop (PLL) in the front end of a video signal receiver for synthesizing a horizontal rate signal. A composite sync signal and a 2H signal from the PLL are provided to a vertical reference signal identification circuit which samples the composite sync signal with the positive-going edge of the 2H pulse. The composite sync signal will only be high on a positive-going edge of the 2H pulse during the broad pulses of the composite sync signal. The vertical reference signal identification circuit counts six 2H pulses to establish a precise three horizontal line reference. If the width of the vertical sync pulse from the first encountered broad pulse to the last, without the occurrence of any discontinuities as defined by a high sample obtained by the positive transition of the 2H pulse, is equal to the three horizontal lines, then a vertical reference signal is provided.

9 Claims, 8 Drawing Figures

VERTICAL REFERENCE SIGNAL IDENTIFICATION SYSTEM

CROSS-REFERENCE TO RELATED APPLICATIONS

This application is related to but in no way dependent upon the following applications which are assigned to the assignee of the present application and filed in the name of the present inventor: Ser. No. 662,198, filed Oct. 18, 1984, entitled "Video Noise Detector" and Ser. No. 702,534, filed Feb. 19, 1985 entitled "Field Responsive Vertical Pulse Generator".

BACKGROUND OF THE INVENTION

This invention relates generally to video signal processing and is particularly directed to the detection and processing of vertical sync pulses in a composite video signal.

A typical video signal incorporates three primary components: a picture signal, a composite synchronization signal, and a blanking signal. The picture signal includes video information such as luminance and chrominance signals. The composite synchronization signal includes pulse-like signals occurring at predetermined horizontal and vertical scan rates which are interspersed between the scan interval picture component in the period generally referred to as the retrace interval. These sync pulses coincide in time with the blanking signals which are used to blank the video during retrace.

The video signal is formed by scanning an image from top to bottom with a plurality of sequential horizontal scan lines. The scan is blanked during horizontal retrace intervals between adjacent scan lines as well as during vertical retrace intervals between successive fields. A plurality of horizontal sync pulses define horizontal timing, while a vertical sync pulse defines vertical timing between successive fields. The vertical sync pulse is defined by six broad pulses in accordance with NTSC standards. In addition, first and second groups of equalizing pulses occur just before and just after the vertical sync pulse during the vertical retrace interval. The equalizing pulses, which occur at twice the line frequency, serve to reduce the effect of line-frequency pulses on the interlaced line scansion of the image and to coordinate vertical timing for proper interlace.

The typical television signal processor separates the vertical sync pulses from the horizontal sync pulses by passing the composite sync waveform through an integrator circuit which smoothes the narrow horizontal sync pulses and provides a rapidly rising voltage for the vertical broad pulses. A slicer is typically set to about one-half the pulse height for providing a sharp output pulse to identify the vertical sync pulse. Various factors in the video signal transmission environment increase the difficulty of synchronization pulse detection in such a pulse integration arrangement. These factors can produce excessive sync pulse amplitude variations, loss of low or high frequency components, imposition of white noise on the sync signal or the super-position of impulse noise on the incoming sync pulse, all of which increase the possibility of erroneous sync. For example, a noisy environment tends to break up, or crack, the vertical sync pulses making them more difficult to detect. In addition, the integration of the various broad pulses places an inherent limitation on the accuracy of detection of the width of the vertical sync pulse.

The present invention is intended to overcome the aforementioned limitations of the prior art by comparing the width of the vertical sync pulse with a precise three horizontal line reference. If the vertical sync pulse width is correct, then a vertical reference signal is provided to a vertical pulse generator for generating field rate pulses. The present invention edge detects each of the broad pulses in the vertical sync pulse rather than accumulating a charge corresponding to their sequential occurrence in providing for the accurate and reliable detection of vertical sync. Although the present invention is particularly adapted for use in a cable television (CATV) encoder, it has application in any system wherein composite video signals are processed.

OBJECTS OF THE INVENTION

Accordingly, it is an object of the present invention to provide improved processing of a composite video signal.

It is another object of the present invention to accurately detect a vertical reference signal in a composite video signal.

Yet another object of the present invention is to generate a signal accurately referenced with respect to a vertical timing portion of a composite sync signal by comparing vertical sync pulse width with an equivalent width in horizontal scan lines.

A further object of the present invention is to generate a timing signal accurately referenced with respect to the vertical rate portion of a composite video signal.

A still further object of the present invention is to provide more accurate detection of the vertical timing portion of a composite video signal in a CATV system.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

FIGS. 3A-3F illustrate the timing of various signals in the vertical reference signal identification system of FIG. 2.

DETAILED DESCRIPTION OF THE PREFERRED EMBODIMENT

Figure 1:
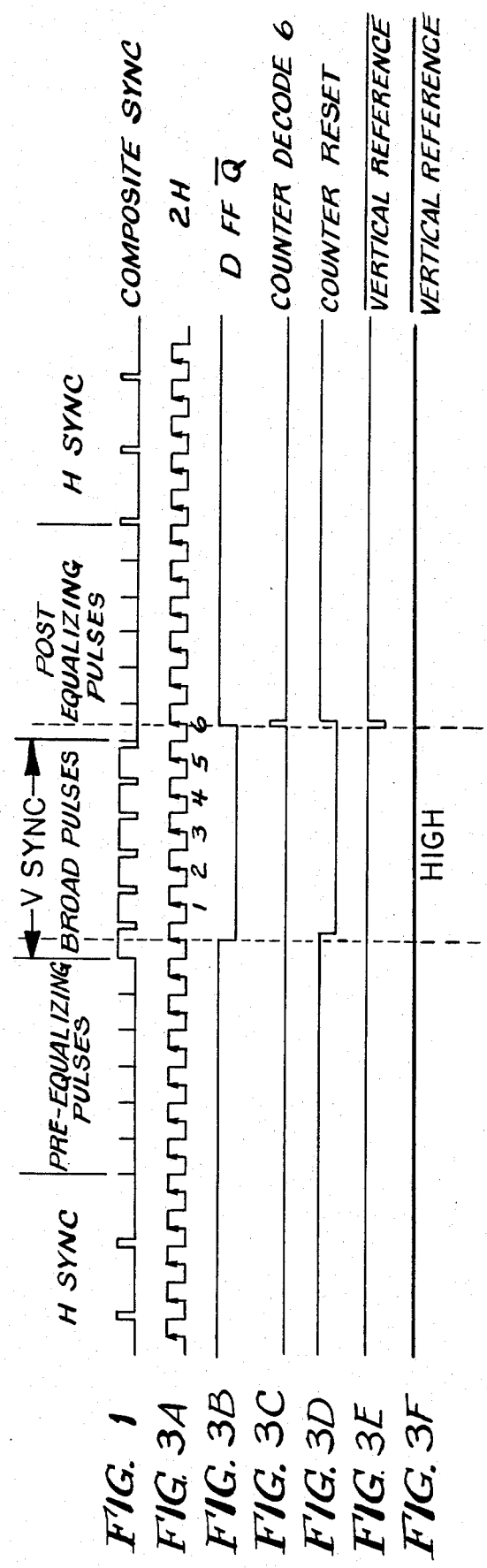
FIG. 1 shows the sequence of various synchronization pulses extracted from a composite video signal.

Referring to FIG. 1, there is shown the arrangement of various timing pulses within the composite sync portion of a composite video signal. The composite sync signal includes a plurality of horizontal synchronizing pulses (H SYNC) in the form of generally rectangular pulses transmitted with each video line. The composite sync signal further includes a vertical blanking interval during which are provided a set of pre-equalizing pulses and a plurality of broad pulses followed by a set of post-equalizing pulses. The equalizing pulses as well as the broad pulses occur at a 2H rate. The equalizing pulses serve to minimize the effect of line-frequency pulses on the interlaced horizontal scan lines and coordinate vertical timing for proper interlace of the video fields. The broad or serrated pulses, also frequently referred to collectively as the vertical synchronizing pulse, are six in number and are transmitted with each field. Excessive noise in the composite video signal tends to mask these various sync signals or to cause the sync signals to appear in a timewise random sequence in the composite video signal. Either of these conditions will degrade the synchronization signal and the video image produced on a display in response thereto.

Figure 2:
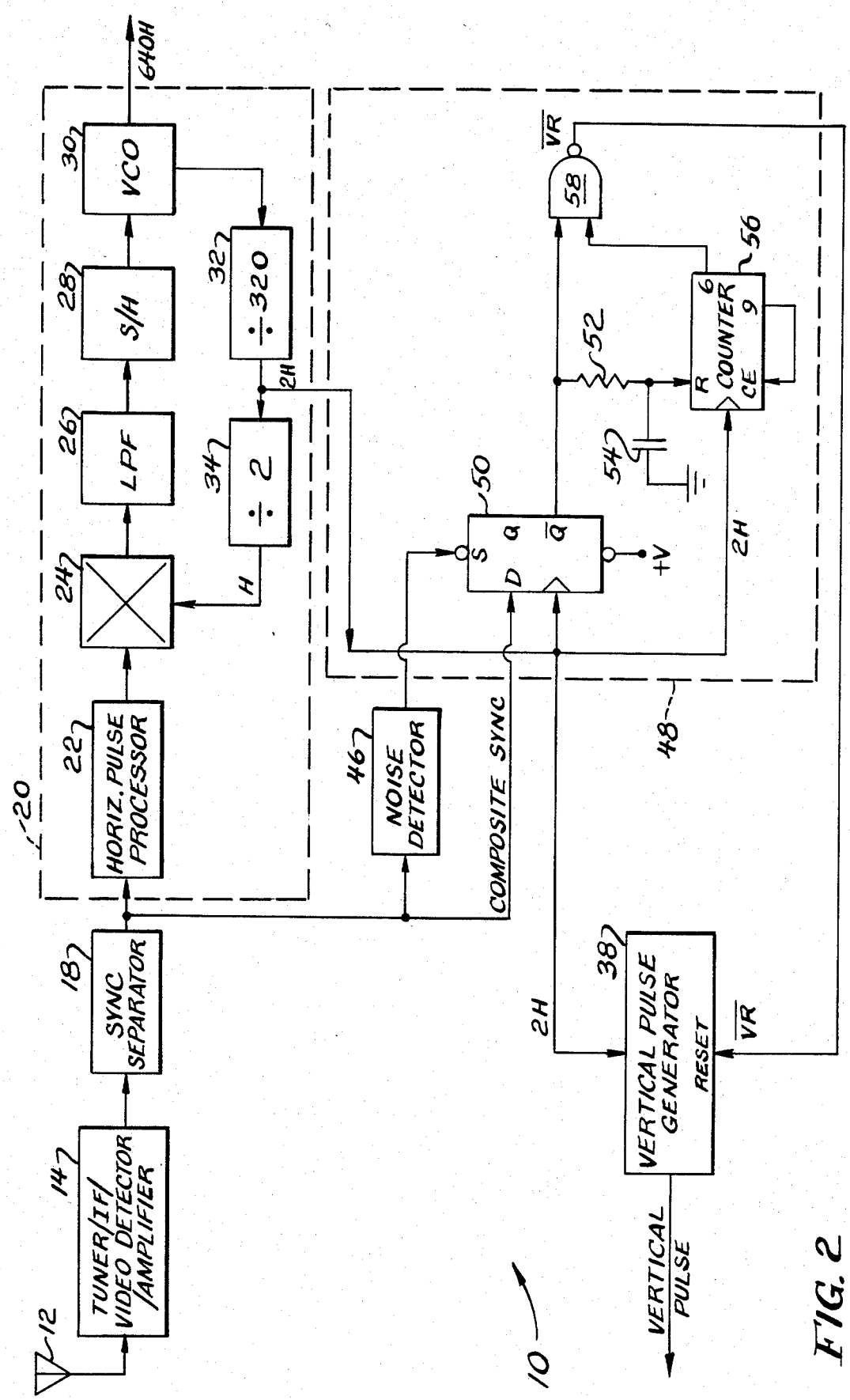
FIG. 2 is a combined schematic and block diagram of a vertical reference signal identification system in accordance with the present invention.

Referring to FIG. 2, there is shown in simplified block and schematic diagram form a vertical reference signal identification system 10 in accordance with the present invention. The vertical reference signal identification system 10 of the present invention is primarily adapted for use in a television transmitter peripheral device such as a cable television (CATV) encoder or video processing amplifier. In a CATV application the encoder regenerates the sync, blanking, and burst components of the video signal provided to the CATV subscribers. However, the present invention is not limited to use in such devices but will operate equally well in any conventional raster-scanned video display system such as a commercial television receiver or a computerized terminal having a video display where it is desired to ensure synchronization between the processed video signals and the scansion of the video display.

A received modulated RF carrier wave is provided from an antenna 12 to a tuner/intermediate frequency (IF)/video detector/amplifier stage 14 where it is demodulated for generating a baseband video signal. The baseband video signal is provided to a sync separator 18 for removing the composite synchronizing component from the composite video signal. The sync separator 18 is generally responsive to the negative-going sync pulses and typically detects the various sync pulses by means of a threshold level detection arrangement set just above the clamped sync tip level. The composite sync signal including the horizontal sync pulses and the equalizing and broad pulses is provided from the sync separator 18 to a horizontal phase lock loop (PLL) 20, a noise detector circuit 46, and to a vertical reference signal identification circuit 48 in accordance with the present invention.

The horizontal PLL 20 includes a horizontal pulse processor 22 which receives the composite sync signal from the sync separator 18 and looks at only the first and last ⅛ portions of a horizontal line for a horizontal sync pulse. This reduces the possibility of noise pulses in the middle of a horizontal line causing the horizontal PLL 20 to lock onto an erroneous sync signal and results in symmetrical pulling of the PLL under noisy conditions. The horizontal pulse processor 22 removes the twice horizontal rate (2H) component from the composite sync signal and provides a signal at the horizontal rate H to a phase detector, or mixer, 24. The output of the phase detector 24 is provided to a low pass filter (LPF) 26 and thence to a sample and hold (S/H) circuit 28. The output of the S/H circuit 28 is provided to a voltage controlled oscillator (VCO) 30, the output of which is fed back via a divide-by 320 circuit 32 and a divide-by 2 circuit 34 to the phase detector 24.

The LPF 26 filters out the sum frequencies generated in the phase detector 24 by the horizontal rate signals provided thereto. The difference frequencies generated in the phase detector are essentially 0. The horizontal PLL 20 locks onto the leading edge of sync. The S/H circuit 28 stores the low pass filtered error signal of phase detector 24 during sync for an entire horizontal line. The output of the S/H circuit 28 is a control voltage for regulating the frequency of the VCO 30. The VCO output is at 640H which is fed back as the horizontal signal H via the aforementioned divide-by 320 and divide-by 2 circuits 32, 34 to the phase detector 24. In this manner, the phase detector 24 provides an output to the LPF 26 according to the difference in frequency and phase between the reference output of the VCO 30 and the horizontal rate signal output from the horizontal pulse processor 22. The horizontal PLL 20 is thus locked in frequency and phase to the leading edge of the incoming sync signal.

A 2H output is provided from the divide-by 320 circuit 32 in the horizontal PLL 20 to the vertical reference signal identification circuit 48. In addition, the composite sync output from the sync separator 18 is also provided to the vertical reference signal identification circuit 48. The phasing of the 2H pulse relative to the composite sync signal is determined by the horizontal PLL 20. The vertical reference signal identification circuit 48 includes a D-type flip-flop 50, to the data input of which is provided the composite sync signal from the sync separator 18 and to the clock input of which is provided the 2H rate sampling signal from the horizontal PLL 20 for detecting the broad pulses in the composite video signal as described below. The operation of the vertical reference signal identification circuit 48 illustrated in FIG. 2 will now be described in detail with reference to FIGS. 1 and 3A–3F which show the timing of various signals within the vertical reference signal identification circuit 48.

The flip-flop circuit 50 samples the composite sync signal in response to the positive-going edge of the 2H pulse provided to the clock input thereof. The Q output of the flip-flop circuit 50 will be HIGH only when the vertical broad pulse portion of the composite sync signal is provided to its data input. Conversely, the $\overline{Q}$ output of the flip-flop circuit 50 will be LOW only during the vertical broad pulse portion of the composite sync signal as shown in FIGS. 1 and 3A and 3B. With the horizontal PLL 20 locked to the horizontal sync pulses, the 2H output therefrom will cause the composite sync signal to be sampled near the middle of each half of a horizontal line. From the various pulse diagrams it can be seen that the $\overline{Q}$ output of the flip-flop circuit 50 will be HIGH during the horizontal sync pulses and the equalizing pulse portion of the vertical interval. The $\overline{Q}$ output of the flip-flop circuit 50 goes LOW on the positive going edge of the 2H pulse due to the presence of a broad pulse. The $\overline{Q}$ output of the flip-flop circuit 50 is provided to the RESET input of a counter 56 which initiates counting of the 2H pulses provided from the horizontal PLL 20 to the CLOCK input of the counter 56. The LOW level of the RESET input of the counter 56 enables it to count the number of pulses provided to its CLOCK input. The DECODE 6 output of the counter 56 is used to count six 2H pulses. With two broad pulses corresponding to one horizontal scan line, the counter 56 establishes a three-line period reference with its DECODE 6 output.

The DECODE 6 output of the counter 56 is provided to one input of a NAND gate 58, while to the other input of NAND gate 58 is provided the $\overline{Q}$ output of the flip-flop circuit 50. The output of the NAND gate 58 representing a vertical reference signal pulse ($\overline{VR}$) will be LOW only when the $\overline{Q}$ and DECODE 6 inputs thereto are both HIGH. From FIGS. 3B and 3C, it can be seen that this will only occur after the counter 56 has counted six 2H pulses from the horizontal PLL 20. Thus, the vertical reference pulse occurs near the middle of the first post-equalization pulse. The counter 56 is allowed to count only if the flip-flop circuit 50 detects the presence of broad pulses in the sampled composite sync signal. Thus, transition of the $\overline{Q}$ and DECODE 6 inputs to the NAND gate 58 to a HIGH state results in a negative-going $\overline{VR}$ pulse provided from the vertical reference signal identification circuit 48 as shown in FIG. 3E. The DECODE 9 output of the counter 56 is fed back to its CLOCK ENABLE input in order to prevent the occurrence of multiple counts of 16, 26, 36, etc., which would give rise to a false vertical reference signal output to the vertical pulse generator 38. The $\overline{VR}$ pulse may be provided to the RESET input of a vertical pulse generator 38 for resetting various counters and logic circuitry (not shown). The vertical pulse generator 38, in turn, provides vertical output pulses. Since the vertical pulse generator 38 used in the present invention may be conventional in design and the details of which do not form a part of the present invention, the vertical pulse generator 38 is not discussed in greater detail herein.

Resistor 52 and grounded capacitor 54 are coupled in circuit between the flip-flop circuit 50 and the counter 56 to allow the DECODE 6 output from the counter 56 to stay on long enough to ensure a vertical reference signal output from NAND gate 58 of sufficient width to effect the resetting of the vertical pulse generator 38.

For the generation of a $\overline{VR}$ pulse at the output of NAND gate 58, the period from the first encountered vertical broad pulse to the last must be exactly three horizontal scan lines. If the $\overline{Q}$ output of the flip-flop circuit 50 goes HIGH at any time during this period due to the occurrence of a noise spike in the composite video signal, the counter 56 will be reset to 0 count by virtue of the HIGH $\overline{Q}$ output from the flip-flop circuit 50 to the reset input of the counter 56 and the $\overline{VR}$ signal will not be provided. The counter 56 will not begin operation again until receipt of the next broad pulse as defined by the D flip-flop 50. The counter 56 thus counts if the RESET input thereto goes LOW, with the decode outputs of the counter 56 going LOW when its RESET input transitions HIGH. From FIG. 3F, it can be seen that the $\overline{VR}$ output of the vertical reference signal identification circuit 48 will remain HIGH if the broad pulses are not encountered by the vertical reference signal identification circuit 48.

The composite sync signal is also provided from the sync separator 18 to a noise detector 46. The details of the noise detector 46 do not form a part of the present invention as it may be conventional in design. However, the aforementioned cross-referenced patent application entitled "Video Noise Detector" discloses a preferred embodiment of the noise detector 46 for use in the present invention and the details of the noise detector disclosed therein are hereby incorporated by reference in the present application. The noise detector 46 provides an output to the SET input of the flip-flop circuit 50 when the noise level in the composite video signal exceeds a predetermined threshold level. The noise detector 46 thus provides for the termination of $\overline{VR}$ outputs from the vertical reference signal identification circuit 48 when noise in the composite video signal exceeds a predetermined threshold level and vertical reference signal pulses provided from the vertical reference signal identification circuit 48 would be unreliable.

There has thus been shown a vertical reference signal identification system for precisely identifying a vertical reference signal such as a vertical sync pulse in a composite video signal which includes equalizer, broad and horizontal sync pulses. If the width of the vertical sync pulse occurs within a designated time interval measured in terms of noise-free, regenerated 2H pulses, a vertical reference signal is provided. This vertical reference signal may be used in various ways in the processing of the composite video signal such as to reset a series of counters in a video processing amplifier or to provide a timing reference for insertion of data on selected vertical blanking interval lines. While particularly adapted for use in the processing of cable television signals as in a CATV encoder, the present invention has application whenever it is desired to generate a vertical reference signal from a composite video signal.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus responsive to a composite video signal including a composite sync signal having horizontal and vertical sync components for generating a precise vertical reference signal comprising:
   sync separation means responsive to the composite video signal for removing the composite sync signal therefrom;
   signal processing means coupled to said sync separation means and responsive to the horizontal sync component of the composite sync signal for generating a sampling signal defining a plurality of sampling points occurring at twice the rate of the horizontal sync component and coincident with only the broad pulses of the vertical sync component of the composite sync signal; and
   circuit means coupled to said sync separation means and to said signal processing means and sampling the composite sync signal in response to the sampling signal for generating a vertical reference signal upon the detection of a predetermined relationship between the sampling signal and the vertical sync component of said composite sync signal.

2. The apparatus of claim 1 wherein said circuit means comprises means for generating said vertical reference signal in response to the coincidence of a selected number of successive sampling points of said sampling signal with respective broad pulses of the vertical sync component.

3. The apparatus of claim 2 wherein said circuit means includes counter means for establishing a reference time interval of a predetermined number of cycles of said horizontal sync component.

4. The apparatus of claim 3 further comprising a D-type flip-flop circuit coupled to said counter means for detecting the simultaneous occurrence of a broad pulse of said vertical sync component and a sampling point of said sampling signal and for providing an output signal to said counter means in response thereto.

5. The apparatus of claim 3 wherein said vertical sync component is sampled at the positive-going edge of said sampling signal.

6. The apparatus of claim 5 wherein said vertical reference signal is generated when six broad pulses of said vertical sync component occur during three cycles of said horizontal sync component.

7. The apparatus of claim 1 wherein said signal processing means includes a phase lock loop for locking said sampling signal to the leading edge of the horizontal sync component of the composite sync signal.

8. The apparatus of claim 1 further comprising noise detection means coupled to said circuit means and to said sync separation means and responsive to noise in said composite video signal for disabling said circuit means and preventing the generation of said vertical reference signal when said noise exceeds a predetermined threshold level.

9. Apparatus responsive to the composite sync signal of a composite video signal, said composite sync signal including horizontal and vertical sync components, for generating a precise vertical reference signal, said apparatus comprising:

sync separation means responsive to the composite video signal for removing the composite sync signal therefrom;

signal processing means coupled to said sync separation means and responsive to the horizontal sync component of the composite sync signal for generating a sampling signal defining a plurality of sampling points occurring at twice the rate of the horizontal sync component and coincident with only the broad pulses of the vertical sync component of the composite sync signal; and circuit means coupled to said sync separation means and to said signal processing means and sampling the composite sync signal in response to the sampling signal for generating a vertical reference signal upon the detection of coincidence between a selected number of successive sampling points of said sampling signal and respective broad pulses of the vertical sync component.

* * * * *